(12) United States Patent
Schmerler (10) Patent No.: US 10,178,175 B2
(45) Date of Patent: Jan. 8, 2019

(54) METHOD AND SYSTEM FOR TRIGGERING AN ONLINE INTERACTION IN CONNECTION WITH A PHYSICAL PRODUCT

(71) Applicant: Jurgen Schmerler, San Diego, CA (US)

(72) Inventor: Jurgen Schmerler, San Diego, CA (US)

(73) Assignee: VERIFIR, San Diego, CA (US)

( * ) Notice: Subject to any disclaimer, the term of this patent is extended or adjusted under 35 U.S.C. 154(b) by 34 days.

(21) Appl. No.: 14/572,411

(22) Filed: Dec. 16, 2014

(65) Prior Publication Data

US 2016/0173609 A1 Jun. 16, 2016

(51) Int. Cl.
| | |
|---|---|
| *H04L 29/08* | (2006.01) |
| *G06F 17/30* | (2006.01) |
| *H04W 4/02* | (2018.01) |
| *H04L 12/24* | (2006.01) |
| *H04W 4/80* | (2018.01) |

(52) U.S. Cl.
CPC ........ *H04L 67/12* (2013.01); *G06F 17/30887* (2013.01); *H04L 41/0806* (2013.01); *H04L 41/0816* (2013.01); *H04W 4/02* (2013.01); *H04W 4/80* (2018.02); *H04L 41/082* (2013.01)

(58) Field of Classification Search
CPC ... H04L 67/12; H04L 41/0816; H04L 41/082; H04W 4/008; H04W 4/02; G06F 17/30887

See application file for complete search history.

(56) References Cited

U.S. PATENT DOCUMENTS

| | | | | |
|---|---|---|---|---|
| 2007/0058634 A1* | 3/2007 | Gupta | ..................... | H04L 67/12 370/392 |
| 2007/0152829 A1* | 7/2007 | Lindsay | ............. | G06K 19/0717 340/572.3 |
| 2008/0061945 A1* | 3/2008 | Hoshina | ................... | H04B 5/02 340/10.51 |
| 2013/0059534 A1* | 3/2013 | Sobalvarro | ............ | G06Q 30/02 455/41.1 |
| 2014/0047487 A1* | 2/2014 | Guedalia | .......... | H04N 21/43615 725/80 |

(Continued)

*Primary Examiner* — Joe Chacko
(74) *Attorney, Agent, or Firm* — David B. Waller (57) ABSTRACT

A computer-readable medium is attached to a physical product and triggers an online interaction when communicatively coupled with a computing device having a display to establishes an online connection whereby services or information pertaining to the physical product can be provided to a user of the product. The computer readable medium can be coupled to the computing device alternatively through a Universal Standard Bus (USB), Near Field Communication (NFC), or Matrix Barcode (e.g., QR code) coupling techniques, for example. The established connection uniquely identifies the product to which the medium is attached and calls an Internet service with that identifying information. The Internet service in turn queries a database where each medium was registered prior to product distribution and extracts a dynamic destination where the computing device should connect to. This destination is returned to the displaying computing device and a variety of follow-on actions can ensue.

17 Claims, 8 Drawing Sheets

(56) References Cited

U.S. PATENT DOCUMENTS

| | | | |
|---|---|---|---|
| 2014/0108943 A1* | 4/2014 | Lee | G06F 3/04817 |
| | | | 715/738 |
| 2014/0379148 A1* | 12/2014 | Sawyer | G06Q 20/145 |
| | | | 700/283 |
| 2015/0058168 A1* | 2/2015 | Garcia | G06Q 30/018 |
| | | | 705/26.61 |
| 2015/0201022 A1* | 7/2015 | Kim | H04W 4/005 |
| | | | 709/203 |
| 2016/0007288 A1* | 1/2016 | Samardzija | H04W 52/0229 |
| | | | 370/311 |
| 2016/0227294 A1* | 8/2016 | Liekens | H04H 60/73 |

* cited by examiner

| | | |
|---|---|---|
| Product and Lot Reference | RS140 Rack Server | 🔍 |
| Contact ○ | Jane Doe | 🔍 |
| DeepSkyLink Start ID ○ | 99910000138 | |
| DeepSkyLink End ID ○ | 99910000181 | |

[ Save ]  [ Save & New ]  [ Cancel ]

METHOD AND SYSTEM FOR TRIGGERING AN ONLINE INTERACTION IN CONNECTION WITH A PHYSICAL PRODUCT

CROSS-REFERENCE TO RELATED APPLICATIONS

This application claims benefit of priority under 35 U.S.C. § 119(e) to Provisional Application No. 61/919,766, entitled "System and Method for Initiating a Customer Interaction," filed Dec. 22, 2013, which is incorporated by reference herein in its entirety.

FIELD OF INVENTION

The invention relates generally to the connection of physical objects to the Internet (Internet of Things—IoT). In particular, the invention relates to an automated, low cost approach to initiation, execution and follow-up of interactions between physical objects, object users, and Internet services that can add enormous value to the usefulness of the physical object, such as a product or product sample, for example.

BACKGROUND OF THE INVENTION

With the ability of cheaper technologies to connect computing devices to the internet, many attempts have appeared recently to connect more and more devices online. Beyond traditional client computers and servers, the Internet connects today many other forms of computing devices, such as cell phones, tablet computers, and printers. Beyond these wired or wireless connections, many manufacturers are trying to provide added value to their products by connecting them online. Examples include thermostats, temperature and weather stations, door locks, cameras, and even refrigerators. These types of connections are commonly referred to as the "Internet of Things" (IoT) and typically use WiFi and/or Ethernet networks in homes and businesses. Alternative connectivity technologies include Bluetooth, fixed wiring, Remote Frequency (RF) connections with dedicated hubs, or cellular networks.

While these types of connections are of increasing use, there are several disadvantages to each of them, some non-limiting examples of which are summarized below.

Power Supply

Aside from permanently cabled connections, most of the approaches above require a power source to connect to the Internet. The devices these technologies typically connect to the internet come with their own A/C connections (e.g., refrigerators, TVs, thermostats) or included batteries (e.g., cameras, door locks). However, there are tradeoffs to such power supplies mainly in areas of size, costs, or required companion charging devices.

Authentication

Existing technologies require pairing and authentication with computing devices and WiFi routers to connect to the Internet. Such pairing typically includes at least a network ID and password. Therefore, in order to authenticate a device, it must possess access to an input device (e.g., keyboard, remote control) and a display device. Also, the authentication process is typically time intensive and complex, making it a poor fit for ad-hoc or one-time connections. It also requires a certain degree of user knowledge of networking technology since personal user interactions are required.

While authentication is acceptable for physical items that tend to be in services for longer periods in the same location (e.g., refrigerators, TVs), it poses an obstacle to online connection of lower value, small items that might need an internet connection only a few times but in different places. For example, pharmaceutical drug samples may need to be connected to the Internet at a physician's office and later at the patient's home again to retrieve drug information.

Costs

Resulting from the use of wired network cards, wireless radio transmitters and receivers, power supply, and authentication technologies, current connection technologies are comparatively expensive to implement. While these costs might be insignificant for expensive, high value goods (e.g., refrigerators, TVs), they are prohibitive for small-ticket items, such as product samples, one-time use products, or product user guides.

Static Connections

While many high value objects can identify themselves with their own Internet Protocol (IP) address, lower cost approaches such as matrix codes or RFID chips can only build static connections to specific Internet destinations, as discussed in further detail below. Once these codes are printed/glued on the physical object, the connection will always be the same and can only be changed if the destination (e.g., Internet site) changes itself.

The above exemplary disadvantages each pose by themselves and in combination severe limits to the spread of the Internet of Things. However, there is a need to connect even small size and small value items to the Internet. Manufacturers and marketers of such items want to get to know their customers, start strategic partnerships with them, and collect information about distribution and use of their products. Reversely, buyers and users of such products may want to receive additional usage information, open online communication channels with the manufacturer, or subscribe to value-added online services to improve their purchase from only product to become a solution to their needs.

One alternative approach that is used mainly in mass mailing campaigns and advertisements is the provision of just the Internet destination. This is typically accomplished by printing the Internet address (URL) in plain text, as a shortened URL, or in the form of a matrix barcode (QR code) onto paper and product packaging. This destination can then be manually entered into an Internet browser location field to reach the particular address. Alternatively, with a specially equipped mobile device, the QR code can be scanned and the user can choose to open the URL with a browser on the device. The three major disadvantages of these approaches are:

- They are not fully automated and significant user action is required (either URL typing or barcode scanning, opening of Internet browser manually), which is error-prone and inconvenient for the user
- The Internet destination is a static address, which cannot be changed once printed (unless the destination Internet site changes itself), and
- The codes and mailings cannot be easily and uniquely identified and all online requests are visible as the same since all products carry the same printed URL.

Another newer approach to transmit location and identifying information is the use of Near Field Communication (NFC) in combination with Remote Frequency (RF) transmitters. NFC is a sub-category of RF identification technology developed specifically for short distance communication. The advantage of NFC solutions is that a unique identification can be transmitted and the scanning process is somewhat easier and less error-prone. However, even more specialized NFC equipment and software is needed to read RF transmitters, user interaction is still required to open the Internet destination and the destination address is still static.

None of the technologies above is integrated into a system that lets manufacturers and distributors of physical goods easily apply computer readable mediums, positively identify (register) them, update their internet destination dynamically (even after shipping them), and receive feedback from them when they are used on a standardized, integrated platform.

SUMMARY OF INVENTION

This invention addresses the above and other obstacles and, in one embodiment, provides a low-cost solution to connecting physical objects to the Internet, whereas prior technologies and methods make online connectivity unfeasible or impractical. With advances in technology and the associated reduction in costs, it is even possible to combine multiple means of initiating a low-cost Internet connection in the same computer readable medium to anticipate any option and display device a user chooses to connect with.

In one embodiment, the invention provides a novel computer-readable medium that automatically initiates an interaction with a computing device, identifies itself and the physical object it is attached to, queries a database regarding the current Internet destination that will serve the interaction, and allows being dynamically registered and updated.

In a further embodiment, the invention provides a computer-readable medium device, that includes: a housing configured to be coupled to a product or packaging of the product; a communication module configured to be communicatively coupled to an external computing device having a display screen; and a memory storing therein computer-executable instructions and information comprising at least one Uniform Resource Locator (URL) address, wherein upon establishing communications with the external computing device, the computer-executable instructions and information is automatically provided to the external computing device, wherein the computer-executable instructions control the external computing device to initiate communications with a predetermined Internet Service that corresponds to the at least one URL address, and wherein the predetermined Internet Service retrieves predetermined content corresponding to information provided to the external computing device that identifies the product, and provides the content to a predetermined computing device configured to receive content from the Internet Service.

In another embodiment, the invention provides a method of providing a product to a user, the product initiating an online interaction with an Internet Service, the method including: registering the product and a unique identifier associated with the product in at least one database; providing a computer-readable medium device attached to the product or packaging of the product to the user, wherein the computer-readable medium device is configured to be communicatively coupled to an external computing device having a display screen, and stores computer-executable instructions, at least one Uniform Resource Locator (URL) address, and the unique identifier, wherein upon establishing communications with the external computing device, the computer-executable instructions and unique identifier is automatically provided to the external computing device, wherein the computer-executable instructions control the external computing device to initiate communications with an Internet Service that corresponds to the at least one URL address, and wherein the Internet Service retrieves content corresponding to unique identifier from the at least one database and provides the content to a predetermined computing device configured to receive content from the Internet Service.

DETAILED DESCRIPTION OF EXEMPLARY EMBODIMENTS OF THE INVENTION

Embodiments of the invention are illustrated by way of examples and not by way of limitation in the figures of the accompanying drawings in which like references indicate similar elements. It should be noted that references to "an" or "one" or "some" embodiment(s) in this disclosure are not necessarily to the same embodiment, and such references mean at least one. Additionally, in the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

Overview

Attachment to Product or Sample

Figure 6:
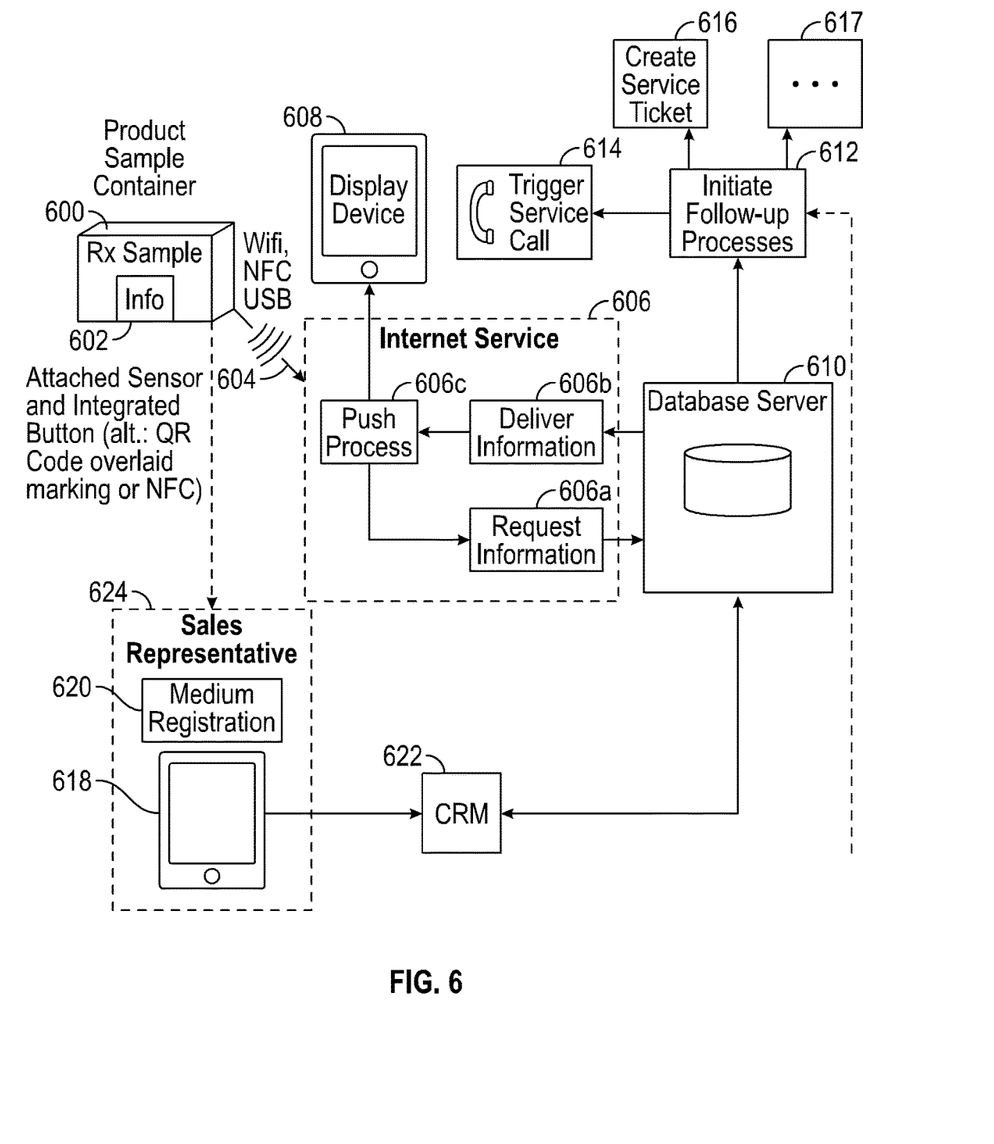
FIG. 6 is an illustration of a general process flow triggered by the medium attached to a product, sample, or container of a physical object, in accordance with one embodiment of the invention.

The computer readable medium of the present invention (hereinafter "medium") is designed to be attached to a physical product 600. The main connecting processing chip, physical connector plug, and in some embodiments of the invention, the antenna are housed in a casing. This casing has on one side a glue pad, clip, or sleeve allowing the casing to be attached to a physical product or product packaging 602. The medium stores computer-readable instructions and/or information for facilitating the customer interactions described in further detail below.

Signal, Wireless or USB

Figure 8A:
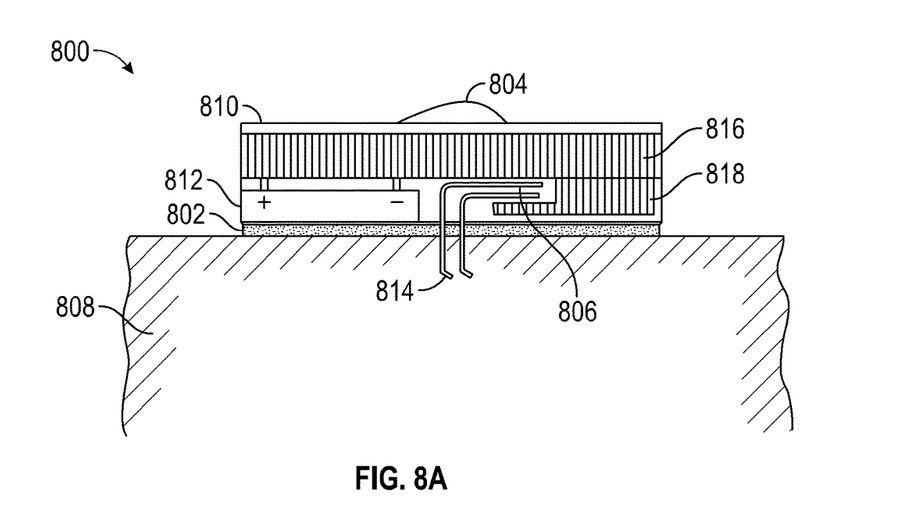
FIGS. 8A and 8B illustrate a cross-sectional side view and a block diagram, respectively, of a sensor and chipset configured to be attached to sample container, in accordance with one embodiment of the invention.

The chipset is able to transmit a series of signals via wired (e.g., USB connection) or wireless connection (e.g., WiFi, NFC) 604. In one embodiment of the invention, the signal can be triggered by a button attached to the chipset 804. In other embodiments the signal is transmitted upon insertion of the medium into the computing device (USB port) or upon reading the medium with NFC receivers within the computing device.

Automatic Communication

Figure 4:
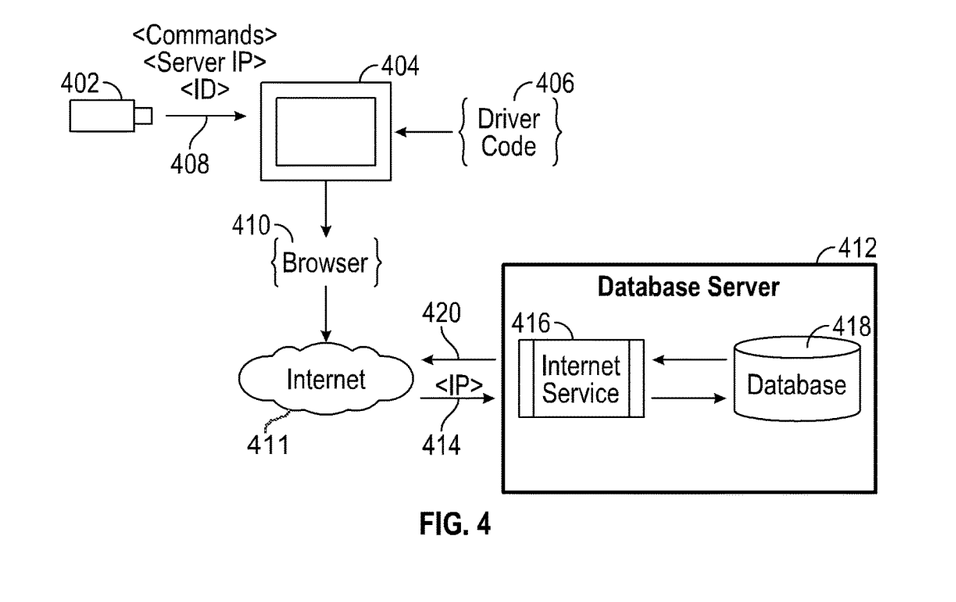
FIG. 4 is a functional operation diagram, in accordance with one embodiment of the invention.

The medium automatically communicates with a database server 412 through networked computing device and identifies itself. Upon establishing a communication link (e.g., wired or wireless) between the medium 402 and the computing device 404, the computing device identifies the type of signal input and calls on standard driver code 406 to interpret the information and/or data provided by the signal. The computer readable medium transmits its signals based on the type of communication link.

If the communication link is through a USB port, the embedded chipset identifies itself as a standard peripheral input device, i.e. keyboard. It then transmits a series of commands to the computing device (emulating keystrokes) that include commands to open a communication software (e.g., Internet browser), the Internet address to the database server, the medium identification, and navigation execution commands 408.

If the communication is established through other means (e.g., NFC, WiFi, Matrix Bar Code), the standard communication drivers and software will interpret the information as URL address and parameters (medium id), open an Internet browser, and navigate to the URL destination 410.

Database Queries for Registered Internet Service Response for Medium and Maybe Location With the medium identification number, an Internet service 416 is started on a database server 412. The Internet service may determine the origin location of the incoming request 414 via IP or geo location information as mentioned above. With those pieces of data, the Internet service 416 queries the database 418 if the medium was previously registered. If a positive entry is identified, the Internet service returns an Internet destination address (URL) that was registered and stored for this particular medium 402 in the database 418. Based on the location information, alternative URLs may be returned based on regional definitions (e.g., URLs for a site in different languages based on the country the medium was connected in). The database can also indicate alternative return URLs based on the location information. Such alternative return URLs are useful if the destination content should be displayed on a pre-defined display device other than the reading device (see 2 paragraphs below). If the medium has not been registered before, the service 416 returns a default URL, for instance to the medium registration page.

Medium and/or Computing Device can Transmit Location Information

Aside from the information necessary to communicatively couple the medium with the database server, commands can be given to include the geographic location information of the computing device, if available. At a minimum, the database server is able to generally locate the location of the computing device via an Internet Protocol (IP) address of the incoming IP service request 414.

Integration

Figure 1:
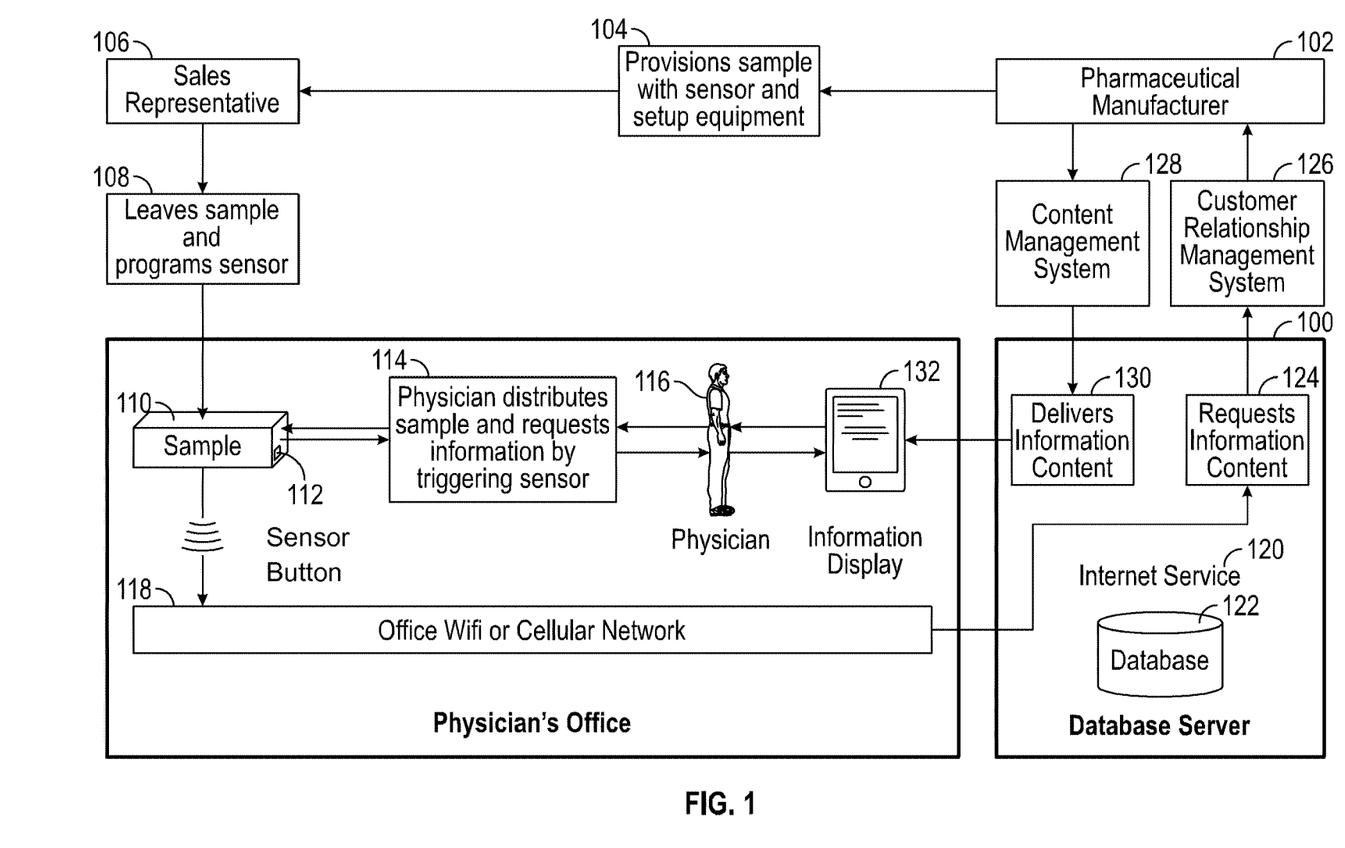
FIG. 1 is and illustration of one embodiment of the present invention in a pharmaceutical distribution setting.

In one embodiment of the present invention, the Internet service 120 and database 122 are integrated with other systems (such as a Customer Relationship Management system (CRM) 126 or a Content Management System (CMS) 128 to seamlessly register products and mediums, log their distribution and use, assign dynamic destinations, store connection requests, capture connection statistics, provide/push content, and initiate follow on actions.

Dynamic Destination Update

Figure 2:
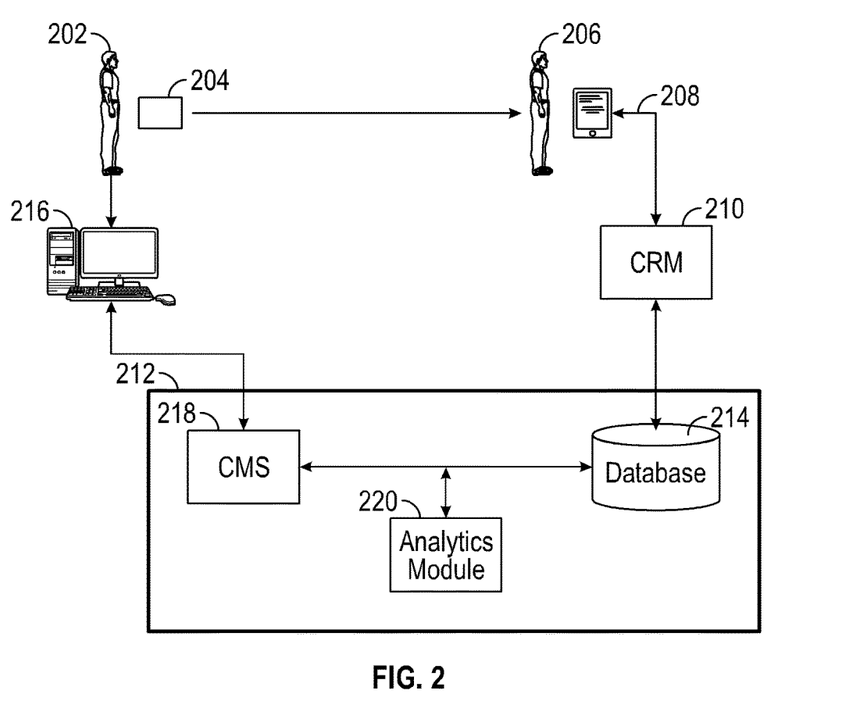
FIG. 2 is an illustration of an exemplary implementation of the present invention, in accordance with one embodiment of the invention.

Authenticated users of the present invention, such as sales representatives 206, use a separate computing device to register 208 the mediums they distribute to customers 202 of the product 204 with all relevant information. The registration process happens through direct connection with the database server (Tracking System 212) or via a system that is integrated with the database server, such as a customer relationship management system (CRM) 210. Through the ability to directly access the Tracking System, the representative 206 can update customer and situation-specific destinations for each individual medium or several mediums in aggregate. These updates can be made even after the medium is attached to a physical object or its distribution when it is no longer under the control of the distributor.

Database Logs the Connection and the Service Request

Parallel to the retrieval of the destination URL from the database 122, the Internet Service 120 also writes a log entry to the database 122. This log entry includes the medium id, timestamp of the connection, and location information. The log can later be analyzed for connection patterns or specific connections. It can also be used as the basis for updates to destination URLs, for instance, to present different information each time the medium is connected to the system.

Display/Receiver Device Receives Directives from Internet Service

In a further embodiment, an Internet service 416 returns a destination URL through the Internet 420 to a display device 404. The display device can be the same as the computing device that originally read the medium 402. In an alternative embodiment, the Internet service 416 can direct the destination URL through the Internet to a specific pre-defined device, described in further detail below with respect to FIG. 6, other than the originating medium reading device. Such a device is actively listening (listening service) for incoming information from the Internet service 416 and displays the destination URL's content whenever the service pushes that information.

Such devices can be predefined at the time of medium registration and their destination data stored in the database 418, together with location information, which determine the exact display device (e.g., the most proximate display device).

Signals can be Modified Through Physical Actions

Figure 5A:
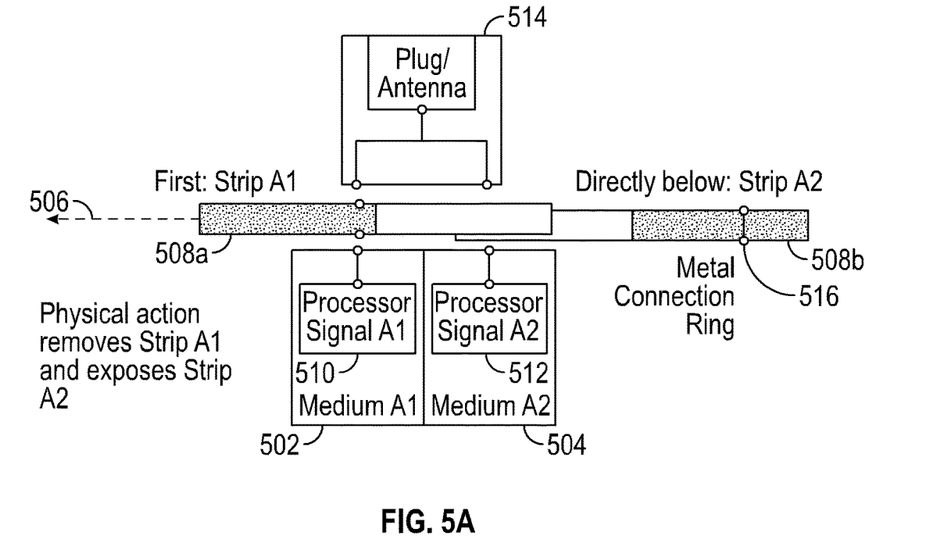
FIGS. 5A and 5B illustrate diagrams of a switchable implementation of two mediums attached to one physical object to send different signals based on the physical state of the physical object, in accordance with one embodiment of the invention.
Figure 5B:
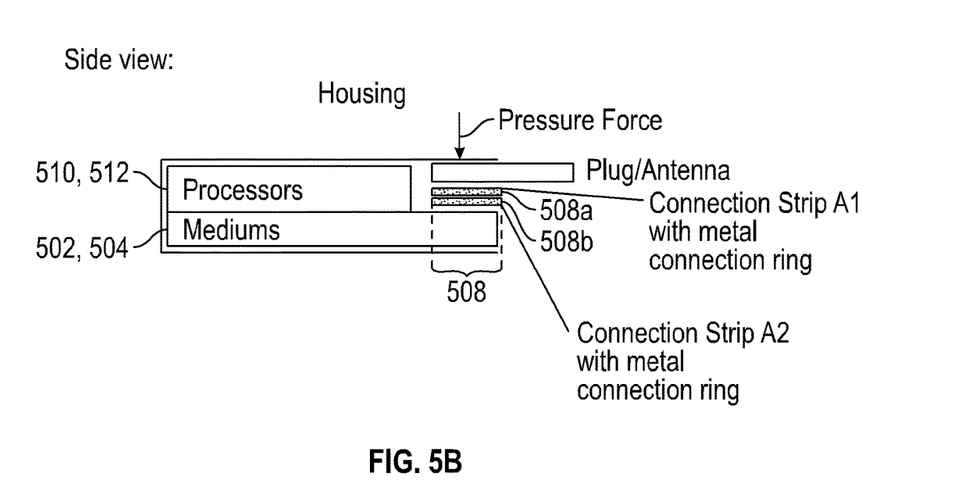

In one embodiment of the present invention, the medium signal can be modified through physical modifications on the object the medium is attached to. In such an embodiment the medium consists of two mediums (Medium A1 502 and Medium A2 504) as described before, each transmitting a separate signal embedded in the medium id. Through physical modification 506 of the attached object a secondary trigger (i.e., sensor) is triggered and sets either A1 active and A2 inactive or, reversely A2 active and A1 inactive. This is accomplished through connector strips 508 that produce connectivity between the USB plug connectors and the medium chipset or between the RF antenna and the medium chipset. The connector strips can be attached to the object packaging, object inserts, or packaging content. Thus, the present invention is able to "sense" if a packaging was opened, a piece of content was removed, or the medium was detached from the object.

Automatic Follow-on Actions are Possible by Internet Service

Aside from delivering the return information to the initiating computing and display device, the Internet service 606 can also trigger follow-up processes 612. Such follow-up processes can include, for example, the scheduling or starting of follow-up emails, service calls 614, the creation of service desk tickets 616, or other follow-up actions 617.

Multi Media

The display device 608 can receive directives from the Internet service 606 that can include the display or performance of various kinds of multi-media content. In addition to Web sites, browser scripts, music, video and other content files, such multi-media files can include the establishment of a chat session, Voice over IP (VoIP) phone call, or video chat.

Device can be Combined with Matrix Code or RFID as Backups

To further include connection possibilities, the medium can include additional readable attributes. These can be included matrix barcodes (e.g., QR codes) or RFID devices 602 to back up the USB connector if a reading device has no or a none-standard USB port.

Computing Device, can be Networked Node or Hub

Figure 7:
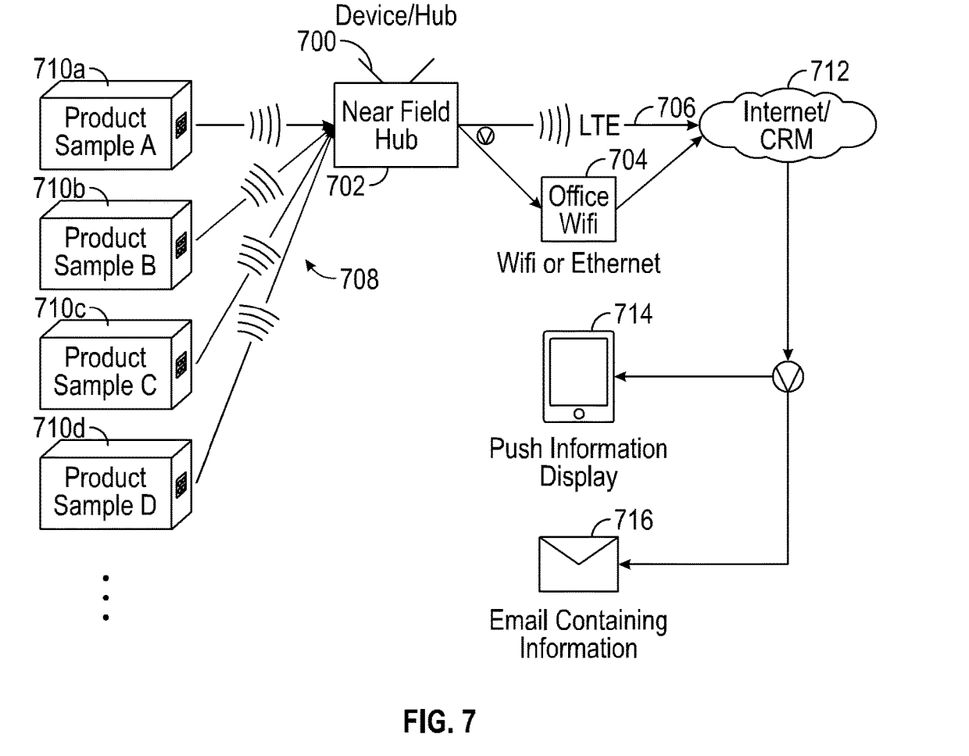
FIG. 7 is an illustration of how several samples communicate through a hub with Internet service, in accordance with one embodiment of the invention.

The computing device 700 receiving the medium information is equipped with standard communication ports, such as an USB port or NFC receivers. The computing device can be a commercially available personal computer, laptop, tablet computer, cell phone, or a networked hub. The only other requirement for the computing device is that it is connected to the Internet either via an Ethernet 704 network connection or through a cellular network connection 706, for example. If the computing device is a hub 702, it can connect and aggregate the information of multiple mediums described in the present invention 708.

Exemplary Embodiment A

In one exemplary embodiment, the invention can be applied to a pharmaceutical sample distribution setting as illustrated in FIG. 1. In this setting, a pharmaceutical manufacturer 102 provisions its drug samples intended for distribution to physicians with a medium 104 storing computer-readable instructions and information thereon, attached to each drug sample package. In one embodiment, the medium is attached to the drug sample packaging by the drug manufacturer during the production process at the packaging stage. The medium is housed in a plastic casing and has a glue pad applied to its underside. Once a protective film is removed, the medium in its housing can be applied to the drug sample packaging. Each housing displays the serial number of the medium on an outside surface of the housing.

These samples are now distributed to pharmaceutical sales representatives for use at their visits with physicians. If the mediums are intended to work jointly at the physician's office, a suitable hub is given as well, which is a small computing device able to read the medium signals.

The sales representative 106 visits the physician's office and deposits the sample in the sample closet. If a hub is to be used, the sales representative sets one up on the first visit, for instance on top of the sample closet, and connects it to the Internet. When the sales representative records the distributed samples, for instance on a tablet PC with access to the pharmaceutical manufacturer's customer relationship management system (CRM) 120, the sales representative also captures the serial numbers of the attached mediums 108.

When the physician 116 wants to evaluate or provide a drug sample to a patient, she removes the sample from the sample closet. If information about the drug is required at this moment, the physician can trigger a sensor on the medium to request the desired information (step 114) at which point the physician's tablet PC or laptop computer, for example, reads the medium and connects to the Internet to receive and display the information. Afterwards, the physician can distribute the sample to one or more patients.

Depending on the medium connector choice, this can happen in several ways, some of which are listed below:
- By plugging the medium into the USB port of the physician's PC or tablet PC, for example, in which case an automatic connection to a destination URL is established via office Wifi or cellular network 118;
- By pressing a button on the medium that triggers a signal to the hub 112, for example;
- By reading a matrix bar code with a cell phone camera or tablet PC camera, for example; or
- By reading the RF signal of the medium with an NFC-enabled cell phone or tablet PC, for example.

Once the connection through the Internet is established via office Wifi or cellular network 118 to the destination URL of the Internet Service 120, the Internet service queries a connection management database 122 and re-routes the information with a drug sample id to a customer relationship management system requesting specific content to be delivered to the physician 116. The customer relationship management system 126 determines which physician this particular sample was registered to by the sales representative 108, and what type of content the physician is interested in. The CRM system can now assemble the appropriate information, text, pictures, videos or other media from a content management system (CMS) 128, following a pre-determined response approach to the information request.

The Content Management System (CMS) 128 is provided to send appropriate content to the display device 132 as the result of the Internet service request 120 that was triggered by the sample 110. The CMS 128 assembles and formats content to be viewable by the display device 132 based on the parameters coming from the database server 100. These parameters, if any, are attached to the URL address of the CMS system. Thus, the CMS 128 and the database server 100 are connected with each other, residing on the same computing devices, or through a network like the Internet.

Based on the origination information, the server software will route and deliver the information content (step 130) to the pre-determined output device 132 on the local network that triggered the request event in the vicinity of physician 116. The software on the local display device 132 then displays the received content.

Aside from the direct response to the request event, the pharmaceutical manufacturer 102 that provided the sample can now initiate more responses, by, for instance, using the above-mentioned customer relationship management system 126 as an automated sales management system. Such actions can also include personal follow-up calls or e-mails from support operations.

Thus, the invention provides a novel approach to customer interaction and support. Whereas current approaches allow companies' sales representatives to interact and be available to physicians only during minimal amounts of time during sales visits, the present invention creates a constant, networked presence in the physician's office through the placement of a computer readable sample. In one embodiment, the medium includes an integrated chipset that assures that the customer can initiate a sales or support interaction at the precise time such an interaction is needed or desired. Obviously, such an on-demand interaction has the potential to greatly increase sales efficiency and effectiveness. An on-demand interaction improves the benefits to the physician, the patients, and the company tremendously as it happens at the exact moment a decision to use or prescribe a product is about to be made. The availability of relevant information at this exact point in time was previously unavailable to customers, sales and support operations, or marketers.

Exemplary Embodiment B

A more generic embodiment of the present invention is described in FIG. 2. Here, a customer 202 receives a physical product with medium 204 from a sales representative 206. At step 208, the sales representative logs the medium serial number and any relevant customer data into her company's CRM system 210. At step 212, the CRM system 210 automatically sends an outbound message to a predetermined Internet service, in accordance with embodiments of the present invention, and updates the database 214 of an Internet Service server system 212.

When the customer 202 connects the physical product's medium to an Internet-connected computing device 216, an automatic connection is established to the Internet Service server system 212 of the present invention. The database server 212 returns an appropriate, pre-defined URL, including content parameters, to a content management system (CMS) 218. This URL can be updated via the CRM system 210 at any time by the sales representative or the company that provided the product. The CMS 218 now displays the specific content for the customers product in the display device 216. In parallel, the connection request is logged in the tracking system database 214 of the present invention and can subsequently be analyzed by an analytics module 220 that can access to the database 214. Communications between the various modules or devices shown in FIG. 2 can be accomplished using known wired or wireless communication techniques. In various embodiments, the CRM 210, CMS 218 and Analytics Module 220 can be implemented with any combination of processing hardware, firmware, software stored in computer-readable mediums, as would be apparent to those of ordinary skill in the art.

By utilizing the above-described systems and methods, marketers, sales, and support functions within the product manufacturers can receive feedback, increase brand loyalty, sell appropriate companion products, and build strategic relationships with their customers.

In the following description, the present invention is described in the context of an exemplary embodiment for the connection and online integration of pharmaceutical samples. However, it is understood that the present invention is not limited to the pharmaceutical industry, and may be used to connect other samples, products or other types of physical objects to the Internet.

Figure 3A:
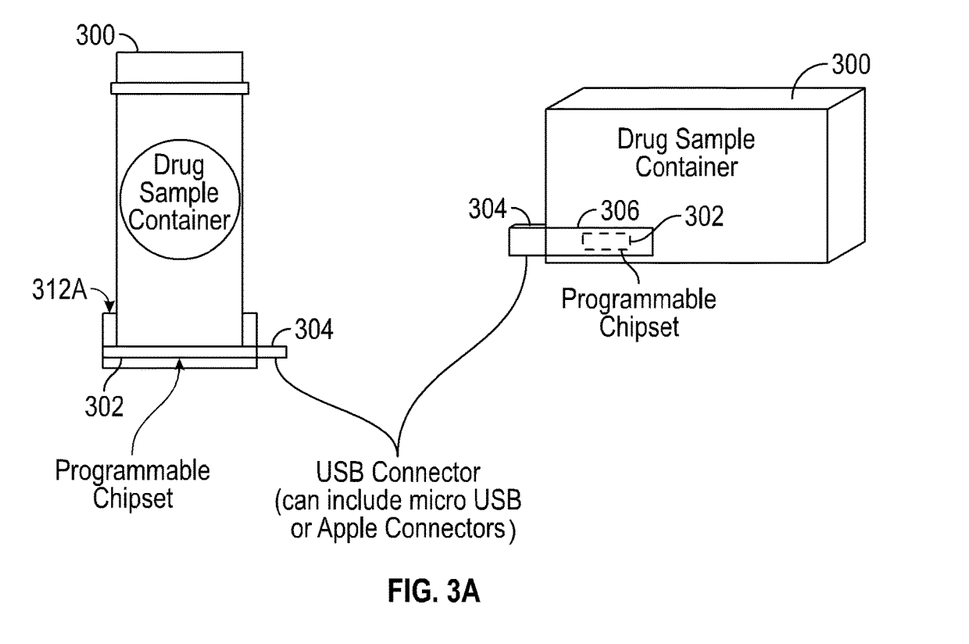
FIGS. 3A and 3B illustrate a medium implementation on different types of sample containers, in accordance with exemplary embodiments of the invention.

Referring to FIG. 3A there are several potential ways to attach a computer-readable medium 306 to a physical object, such as a pharmaceutical sample container 300, which may be either a medicine or pill bottle or vial, or a box containing a pill bottle, for example, as shown in FIG. 3A. In one embodiment, the medium 306 includes a chipset 302 that transmits a signal to a computing device (not shown). The chipset is housed in a casing for protection and preferably aesthetically blends-in with the product it is attached to. The only protruding item may be a connector (e.g., USB) or antennae 304 for near field communication, for example. The latter can be fitted into the casing in most circumstances. One such casing can be formed in the shape of a bottle adapter 312A configured to be attached or integrated with a bottle type package. On the outside of the casing images and/or information can be printed, such as a medium serial number and/or a matrix bar code (e.g., QR code). In one embodiment, the medium 306 can be attached to box-type enclosure for a physical product with a glue pad on one of the sides of the casing. This glue pad is protected by a film or paper that is removed before the medium is attached to the product enclosure. In embodiment, the attachment is designed or configured to be permanent and removal attempts risk damaging the product.

Figure 3B:
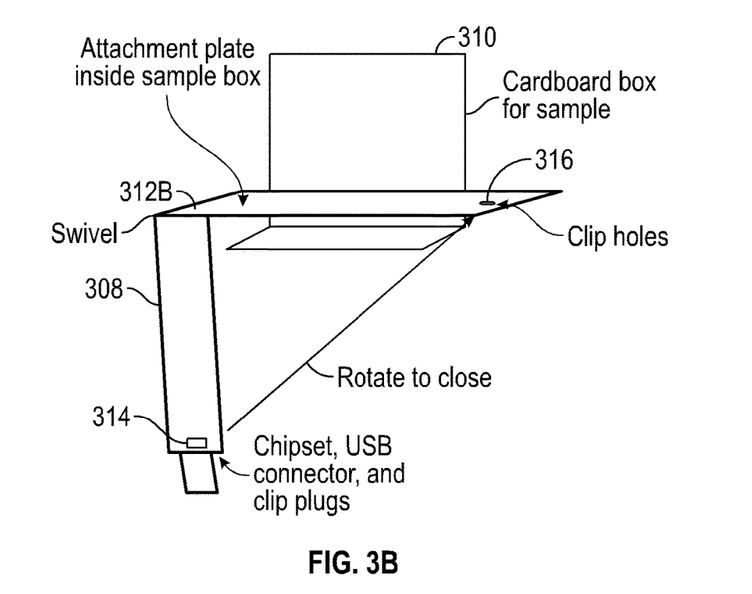

FIG. 3B illustrates an alternative attachment design that might be applicable if the presence of certain chemicals in the glue is unacceptable or if a permanent fixture to the object is not desirable. For example, the medium 308 can be connected to the object 310, e.g., a cardboard box, with a physical adapter 312B, where the medium 308 is minimally encased or has the ability to fold out, the adapter being attached to the object through pressure, adhesive, or other semi-permanent connection. The attachment can also be accomplished in form of a clip 314 on the same plate as the medium 308, where the medium swivels and locks the clip 314 into clip holes 316 after looping around the cardboard box of the sample or the sample itself.

The attached medium is computer readable, i.e., it can transmit a signal to a computing device via either a USB connector and/or wireless antenna (not shown) that can be provided with the medium, as discussed above. Several known communication technologies and protocols can be employed by themselves or in tandem to offer the user alternative ways of establishing a connection between the physical object and the Internet.

In one embodiment, the medium includes a USB connector and a connection through USB connector to a USB port of the customer's computing device is the method connection to the Internet Service. In one embodiment, to establish an automatic connection via USB, the medium can be fitted with readily available hardware components that mimic standard USB keyboards and sending of key commands via USB to the computing device. As an example, the following hardware components can be used:

AVR 32 bit Micro-Controller
        AT32UC3B1256
        256 Kbytes Internal Flash Storage
        High Speed USB 2.0 BUS
    Standard USB "Type A" Connector In one embodiment, the micro-controller can have one or more of the following properties to resemble a connected, typing keyboard (here the Atmel AT32UC3B1256—see http://www.atmel.com):

High Performance, Low Power AVR 32 UC 32-Bit Micro-controller
    Compact Single-cycle RISC Instruction Set Including DSP Instruction Set
    Read-Modify-Write Instructions and Atomic Bit Manipulation
    Performing up to 1.39 DMIPS/MHz
    Up to 83 DMIPS Running at 60 MHz from Flash
    Up to 46 DMIPS Running at 30 MHz from Flash
    Memory Protection Unit
    Multi-hierarchy Bus System High-Performance Data Transfers on Separate Buses for Increased Performance
7 Peripheral DMA Channels Improves Speed for Peripheral Communication
Internal High-Speed Flash
512K Bytes, 256K Bytes, 128K Bytes, 64K Bytes Versions
Single Cycle Access up to 30 MHz
Prefetch Buffer Optimizing Instruction Execution at Maximum Speed
4 ms Page Programming Time and 8 ms Full-Chip Erase Time
100,000 Write Cycles, 15-year Data Retention Capability
Flash Security Locks and User Defined Configuration Area
Internal High-Speed SRAM, Single-Cycle Access at Full Speed
96K Bytes (512 KB Flash), 32K Bytes (256 KB and 128 KB Flash), 16K Bytes (64 KB Flash)
Interrupt Controller
Autovectored Low Latency Interrupt Service with Programmable Priority
System Functions
Power and Clock Manager Including Internal RC Clock and One 32 KHz Oscillator
Two Multipurpose Oscillators and Two Phase-Lock-Loop (PLL) allowing Independent CPU Frequency from USB Frequency
Watchdog Timer, Real-Time Clock Timer
Universal Serial Bus (USB)
Device 2.0 and Embedded Host Low Speed and Full Speed
Flexible End-Point Configuration and Management with Dedicated DMA Channels
On-chip Transceivers Including Pull-Ups
USB Wake Up from Sleep Functionality
One Three-Channel 16-bit Timer/Counter (TC)
Three External Clock Inputs, PWM, Capture and Various Counting Capabilities
One 7-Channel 20-bit Pulse Width Modulation Controller (PWM)
Three Universal Synchronous/Asynchronous Receiver/Transmitters (USART)
Independent Baudrate Generator, Support for SPI, IrDA and ISO7816 interfaces
Support for Hardware Handshaking, RS485 Interfaces and Modem Line
One Master/Slave Serial Peripheral Interfaces (SPI) with Chip Select Signals
One Synchronous Serial Protocol Controller
Supports I2S and Generic Frame-Based Protocols
One Master/Slave Two-Wire Interface (TWI), 400 kbit/s I2C-compatible
One 8-channel 10-bit Analog-To-Digital Converter, 384 ks/s
16-bit Stereo Audio Bitstream DAC
Sample Rate Up to 50 KHz
QTouch Library Support
Capacitive Touch Buttons, Sliders, and Wheels
QTouch and QMatrix Acquisition Referring to FIG. 4, in one embodiment, the present invention includes a computer readable medium 402 that consists of one or more chipsets, a wired port connector (plug) and/or an antenna to transmit signals to a computing device 404. The computing device processes the signal as described above. In one embodiment, where the computing device 404 is a desktop computer, laptop computer, tablet computer, or smart phone, it may also serve as the display device to provide the interaction content. However, the display device (described in FIG. 6) can be separate from the initial computing device 404 and reside in the vicinity of the latter, attached to the same or different network with Internet access.

The computing device 404 includes a browser 410 and is attached to a network with access to the wider Internet, such as an Ethernet/WiFi connection or a connection through a cellular network, as described in further detail with respect to FIG. 7 below. The browser 410 executes appropriate commands and protocols to allow the device 404 to communicate via the Internet 411 using known techniques.

The computing device sends an Internet service request with URL and identifying information through the Internet 411 to a database server 412, which is part of the present invention. In its processing unit the database server 412 runs an Internet service 416 managed by a standard Internet service software, such as Internet Information Server, Apache Tomcat, or similar. The Internet service listens for incoming requests and processes them when they arrive. The main processing task is to query a database 418 that either resides on the same physical machine or on a separate database engine device. The engines for database 418 and Internet service 416 are connected in a network and together considered the database server 412 in the present invention. The database server 412 can also be connected to third party systems, such as a Customer Relationship Management system (CRM) or data analytics systems (see FIG. 2). Such systems can reside on the same computing devices as the database server or, more likely, are connected with the database server 412 over a network or the general Internet.

The medium 402 further carries the connectivity instructions programmed in a suitable script language and transferred onto the internal flash storage. These instructions are automatically executed after connection of the medium with the computing device 404. A simple sample script to connect with a central Internet service 416 can be stored as follows:
REM Open the command box
GUI-R
REM send the database server location and medium id
STRING http://deepskyhost.comPid=9992000244
REM execute
ENTER From this point the Internet service 416 will continue the system functionality process.

In an embodiment with an active wireless connection, like WiFi or Bluetooth, the medium 402 will also send the Internet service URL to the computing device like a wireless keyboard would. The medium will be equipped with readily available sender circuits (WiFi or Bluetooth) and a small power source, such as a Lithium ion battery. The more likely way to read the medium wirelessly by the computing device is through a passive signal, such as remote frequency (RF) or matrix barcode. The computing device 404 will decode the signal using standard operating system software as provided by most versions of Apple's iOS or Google's Android operating systems. In one embodiment, the signal can have the following structure:
http://deepskyhost.com/?id=9992000001
or route through an abbreviated URL server to minimize size requirements of the signal:
http://dsky.link/?id=9992000001

In both cases the standard operating software of the computing device will identify the signal as a URL address and open it in a browser 410, thus connecting to the Internet service 416.

If the mediums connect through a hub it is most typically accomplished through wireless connections. The hub as the computing device can read the medium in time intervals without a specific action necessary, or whenever a trigger event takes place. Such events can be the pressing of a button, the triggering of a switch (see FIG. 5), or the unavailability of the medium if it was removed from the proximity of the hub.

When a connection occurs with the Internet service, the present invention has the ability to transfer the location information of the computing device, and hence the physical object the medium is attached to. Such a transfer can be accomplished through a POST request and an associated server-sided script like:
http://deepskyhost.com/postgps/?id=9992000001

The Internet service 416 script can alternatively analyze the Internet protocol (IP) address origination of the computing device, as for example in:
https://maps.google.com/maps?q=%LOCATION The code to access the location information through an Internet service 416 HTTP protocol can be implemented like this example:

```
public String registerGPS( ) {
String gps= "";
if(!gpsSensor){
if(isGpsOn(appContext))
{
Log.d("GPS on","Using GPS Provider here");
lm.requestLocationUpdates(LocationManager.GPS_PROVIDER,
200,0,locationListener);
gps = "GPS Provider registered here";
}
else
{
Log.d("GPS off","using NETWORK Provider here");
lm.requestLocationUpdates(LocationManager.NETWORK_PROVIDER,
200,0,locationListener);
gps = "Network provider registered here";
}
}
gpsSensor = true;
return gps;
}
```

With the received connection of the medium, its id number and other parameters, the Internet service 416 connects to the database 418 that contains the registered medium id numbers, destination URLs, and, if applicable, other criteria like alternative destinations based on location or alternative display device addresses.

If a positive medium id entry in the database is identified, the Internet service returns the Internet destination address (URL). Otherwise the Internet service returns a default destination address.

In one embodiment, a simple Internet server 416 query to the database 418 can be implemented as follows:
SELECT URL FROM DB.DBLinkID where D BLinkID=MediumID;

The returned URL is then used to redirect 420 the requesting browser 410 to the destination content for the specific product and medium 402.

At the same time the Internet service 416 fulfills the incoming request, it makes a connection log entry to a separate table of the database 418 including the medium id, timestamp of the connection, and location information.

A separate service or an integration with the main Internet service 416 can periodically analyze the connection log and change destination URLs in the database 418 based on the number of successful connections of the medium 402 with the database server 412.

Referring to FIGS. 5A and 5B, in some embodiments, the physical object can be equipped with more than one medium, which are activated alternatively depending on some physical action on the product. FIG. 5A illustrates a top view of this implementation, while FIG. 5B illustrates a cross-sectional side view, in accordance with one embodiment of the invention. In this implementation, each medium can have its own medium id number, transmitted by its embedded associated processor 510, 512, respectively. The signal is read by the computing device 404 (FIG. 4), even if the mediums are housed jointly and on the same physical object 502, 504. The Internet service response is dependent on whether medium A1 502 or A2 504 is connected, i.e., active. In one embodiment, this activation is accomplished through connector strips A1 and A2 508 that produce connectivity with differently positioned connector rings 516 between the USB plug connectors 514 and the medium chipset or between the RF antenna 514 and the medium chipset. The connector strips 508a, 508b can be attached to the object packaging, object inserts, or packaging content. Thus, the present invention is able to "sense" if a packaging was opened (e.g., A1 medium is activated), a piece of content was removed (e.g., A2 medium is activated), or the medium was detached from the object (e.g., a third medium A3 (not shown) is activated).

Referring to FIG. 6, a general process flow is illustrated in accordance with one embodiment of the invention. As shown in FIG. 6, authenticated users of the present invention, such as sales representatives 624 can use a separate computing device 618 to perform registration 620 of the physical object 600 having an attached medium 602. The object 600 with attached medium 602 can thereafter be distributed to customers with relevant information. The computing device 618 can be, for instance, a laptop PC, a tablet PC, a smart phone, or a desktop PC. The connection to the database server can be established through the Internet and via local network or cellular network.

Figure 10:
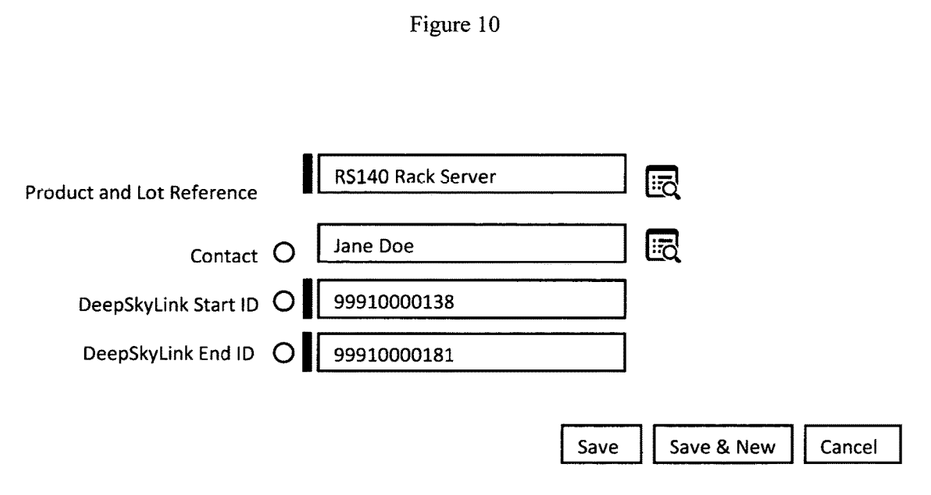
FIG. 10 illustrates a typical electronic registration form for the registration process, in accordance with one embodiment of the invention.

In one embodiment, the registration process is initiated through a direct connection with the database server 610 or, alternatively, via a customer relationship management system (CRM) 622, which can be part of the same system as the database server 610 or, alternatively, located in a separate system. After accessing the database server 610, either directly or via CRM 622, the representative 624 can update customer- and/or situation-specific destinations for each individual medium 602 or several mediums in aggregate. These updates can be made even after the medium is attached to a physical object 600 or its distribution when it is no longer under the control of the distributer. The destination can be either entered directly into the database 610 together with the medium 602 id number, or through use of preset destination URLs based on specific criteria. Criteria can include, for instance, customer types, products or product types, production lot numbers, or interaction types. A typical electronic registration form is shown in FIG. 10.

With the medium registration completed, the physical object 600 with the attached medium 602 is ready to be used. The signal from the medium 604 triggers an Internet Service 606 (further detailed in FIG. 7) by requesting content from the Internet Service 606 (step 606a). In response, the Internet Service delivers the requested or predetermined content (step 606b) through a push process 606c to a display device 608.

Further services or integrations with the main Internet service 606 can trigger follow-up processes 612, such as generation of service calls 614 and service tickets 616, or other predetermined functions 617 by calling process services on the same or different database servers. Such services can reside on the Internet or in a private network, for instance as part of a customer relationship management system (CRM) 622.

In one embodiment, the integration with a CRM or other system is accomplished through passing of inbound and outbound messages between the CRM system 622 and the database server 610.

Messages to integrate an external CRM system and the database server can be sent in Web Services Description Language (WSDL), for example, which are parsed and acted on by each of these systems. A simplified implementation of these integration messages is shown in FIG. 10.

```
<!--
CRM Outbound Notification Web Services API Version 1.0
Generated on 2014-10-21 22:15:20 +0000.
-->
<definitions xmlns="http://schemas.xmlsoap.org/wsdl/"
xmlns:soap="http://schemas.xmlsoap.org/wsdl/soap/">
  <types>
    <schema xmlns="http://www.w3.org/2001/XMLSchema"
elementFormDefault="qualified">...</schema>
  </types>
  <!-- Method Messages -->
  <message name="notificationsRequest">...</message>
  <message name="notificationsResponse">...</message>
  <!-- PortType -->
  <portType name="NotificationPort">...</portType>
  <!--...-->
  <binding name="NotificationBinding" type="tns:NotificationPort">
    <soap:binding style="document"
transport="http://schemas.xmlsoap.org/soap/http"/>
    <operation name="notifications">
      <soap:operation soapAction=""/>
      <input>...</input>
      <output>...</output>
    </operation>
  </binding>
  <!-- Service Endpoint -->
  <service name="NotificationService">
    <documentation>Notification Service Implementation
    </documentation>
    <port binding="tns:NotificationBinding" name="Notification">
      <soap:address
location="https://deepskyhost.com/OMSolution/
DSLNotificationService.asmx"/>
    </port>
  </service>
</definitions>
```

While most redirection and integration actions can be handled by Internet services 606 and Content Management Systems (described in FIG. 2), in one embodiment, some display actions of multimedia content are relegated to the display device 608, which can be separate from the computing device discussed in FIG. 4, and the installed handling software and the content types accepted by the display device 608. For instance, pdf type files might be returned as the relevant content from the Internet service 606, but the decision concerning how to display that content can be left to the pdf viewer installed on the display device 608. In one embodiment, the service or web page at the redirected destination URL checks for available display software on the display device 608 and, if necessary, enables the download of the software required.

Referring to FIG. 7, in one embodiment, the computing device 700 receiving the medium information can be equipped with standard communication ports, such as an USB port or NFC receivers. The computing device is connected to the Internet or CRM 712 either via a wired or wireless Ethernet 704 network connection or through a cellular network connection 706, for example. If the computing device is a hub 702, it can connect and aggregate the information of multiple mediums 710a-d described in the present invention 708. In one embodiment, the connection established between the computing device or hub 700 and the Internet/CRM 712 will further push information to a display device 714 or trigger additional actions, such as sending an e-mail 716.

Referring to FIG. 8A, in one embodiment, a medium and sensor assembly 800 is composed of several components attached to a product container 808. An adhesive layer 802 attaches the medium enclosure 810, which contains the optional power source 812, and connects the medium. The medium can contain one or more medium connectors 814 that physically connect to the product container 808, for instance, attaching to the open/close sleeve of the packaging or the content of the container. The connectors 814 attach via the connector strips described in FIG. 5 acting as secondary sensor triggers 806 by bridging the medium's processor and circuit board 816 and the attached antenna or plug 818. If, for instance, a piece of the content is removed from the container, the connector 814 that is attached to it will also pull and remove the connector strip 806 that is in turn attached to the connector 814. A signal is now sent as explained by FIG. 5, indicating that a piece of the container content was removed.

Instead of or in combination with the secondary triggers, i.e. connectors 814 and connector strips 806, the active processor's 816 sending of a signal can also be triggered directly by pressing an attached button 804 (primary trigger).

Figure 8B:
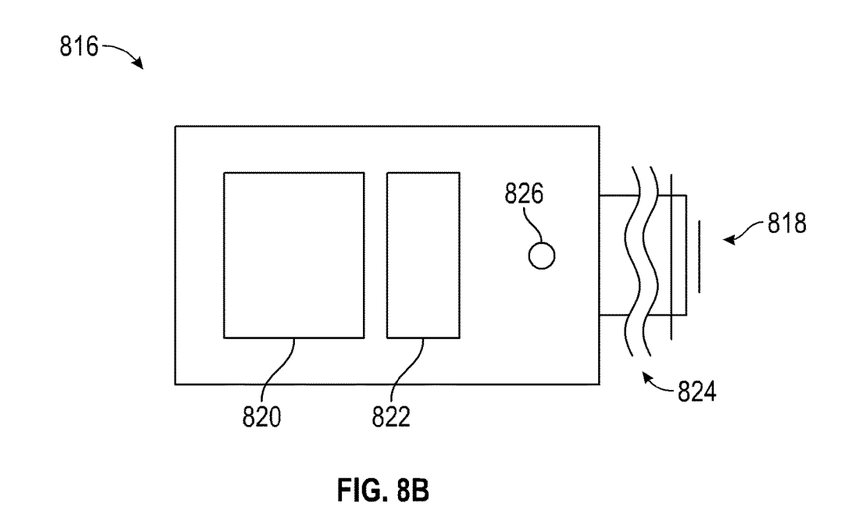

When triggered, the processor on the circuit board 816, shown in FIG. 8B, executes the instructions for sending a signal. To do so, the micro controller 820, described in detail above, retrieves the signal content (URL, medium id, etc.) from a flash storage memory 822 and sends the signal to the Wifi, NFC or USB communication interface (antenna or plug) 818 attached to the circuit board. The circuit board also may include primary trigger (i.e., button) 826 receptors or a secondary trigger mechanism 824 as described in FIG. 5 in more detail. If the communication interface does not provide sufficient power, the circuit board is connected to the optional power source 812.

Figure 9:
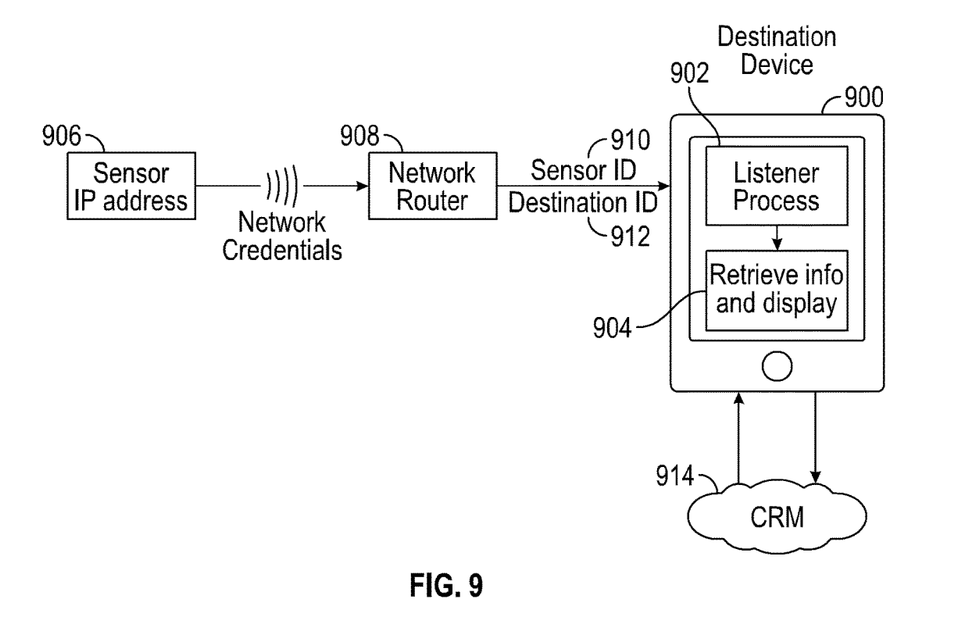
FIG. 9 illustrates a sensor network location with direct access to a local push service on a computing and display device, in accordance with one embodiment of the invention.

Referring to FIG. 9, a destination device 900 can run a listener process 902 that listens to the medium sensor 906 information transmitted by the network router 908. The transmitted information can be any predetermined information such as a medium sensor ID 910 or destination ID 912. The listener process is connected to a process 904 that retrieves the requested information from the Internet-connected CRM system 914 and thereafter displays it on the device 900.

While various embodiments of the invention have been described above, it should be understood that they have been presented by way of example only, and not of limitation. Likewise, the various diagrams may depict an example architectural or other configuration for the invention, which is done to aid in understanding the features and functionality that can be included in the invention. The present invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Although specific terms are employed herein, they are used in a generic and descriptive sense only and not for purposes of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by one or more appropriately configured modules located in one or more nodes as described above. As used herein, a "module" can refer to hardware firmware, software and any associated hardware that executes the software, and any combination of these elements for performing the associated functions described herein. Additionally, as would be apparent to one of ordinary skill in the art, the various modules may be discrete modules; however, two or more modules may be combined to form a single module that performs the associated functions, or the functions of a single module may be divided among two or more modules, according to various embodiments of the invention.

Additionally, one or more of the functions described in this document may be performed by means of computer program code that is stored in a "computer program product," "non-transitory computer-readable medium," and the like, which is used herein to generally refer to media such as, memory storage devices, or storage units. These, and other forms of computer-readable media, may be involved in storing one or more instructions for execution by a processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

What claimed is:

1. A non-transitory computer-readable medium device, comprising:
   a housing configured to be coupled to a product or packaging of the product; a communication module configured to be communicatively coupled to an external computing device wherein said external computing device having a display screen; and
   a memory storing therein computer-executable instructions and information comprising at least one Uniform Resource Locator (URL) address, wherein upon establishing communications with the external computing device, the computer-executable instructions information and communication meta information is automatically provided to the external computing device, wherein the computer-executable instructions control the external computing device to initiate communications with a predetermined Internet Service that corresponds to the at least one URL address,
   wherein the predetermined Internet Service comprises an analytics module configured to dynamically prioritize and update recent relevant content information concerning the product based on an analysis of the historical connection patterns of comparable identifying information and communication meta information, and wherein the predetermined Internet Service retrieves the updated content information concerning the product from a database containing content associated with a plurality of products, and provides the relevant content information to a predetermined computing device configured to receive content from the Internet Service.

2. The non-transitory computer-readable medium of claim 1, wherein the computer-executable instructions further instruct the external computing device to send information indicative of a geographic location of the external computing device to the predetermined Internet Service.

3. The non-transitory computer-readable medium of claim 1, wherein the communication module comprises an antenna and wireless communication circuitry for transmitting signals wirelessly to the external computing device, thereby establishing communications with the external computing device.

4. The non-transitory computer-readable medium of claim 3, wherein the wireless communication circuitry comprises a RFID chipset.

5. The non-transitory computer-readable medium of claim 1, further comprising at least one sensor configured to detect an action by a user and thereafter send a signal to the external computing device that is responsive to the action by the user.

6. The non-transitory computer-readable medium of claim 1, wherein the predetermined computing device comprises the external computing device that is communicatively coupled to the communications module.

7. The non-transitory computer-readable medium of claim 1, wherein the predetermined computing device comprises a second external computing device that is different from the external computing device that is communicatively coupled to the communications module.

8. The non-transitory computer-readable medium of claim 1, wherein the content comprises information concerning a further service or product that can be provided to a user of the product.

9. The non-transitory computer-readable medium of claim 1, further comprising a matrix bar code printed on a surface of the housing.

10. The non-transitory computer-readable medium of claim 1, wherein the external computing device comprises a communication hub that communicates with a plurality of computer-readable medium devices.

11. A method of providing a product that initiates an online interaction with a user of the product via an Internet Service, the method comprising: registering the product and a unique identifier associated with the product in at least one database and providing a non-transitory computer-readable medium device attached to the product or packaging of the product to the user, wherein the non-transitory computer-readable medium device is configured to be communicatively coupled to an external computing device having a display screen, and stores computer-executable instructions, at least one Uniform Resource Locator (URL) address, and the unique identifier, wherein upon establishing communications with the external computing device, the computer-executable instructions, information and communication meta information and unique identifier is automatically provided to the external computing device, wherein the computer-executable instructions control the external computing device to initiate communications with a predetermined Internet Service that corresponds to the at least one URL address, wherein the predetermined Internet Service comprises an analytics module configured to dynamically prioritize and update recent relevant content information concerning the product based on an analysis of the historical connection patterns of comparable identifying information and communication meta information wherein the Internet Service retrieves the updated content information corresponding to the unique identifier from the at least one database and provides the relevant content information to a predetermined computing device configured to receive content from the Internet Service, wherein the content is dynamically updated prior to being delivered to the predetermined computing device.

12. The method of claim 11, wherein the computer-executable instructions further instruct the external computing device to send information indicative of a geographic location of the external computing device to the predetermined Internet Service.

13. The method of claim 11, wherein the predetermined computing device comprises the external computing device that is communicatively coupled to the non-transitory computer-readable medium device.

14. The method of claim 11, wherein the predetermined computing device comprises a second external computing device that is different from the external computing device that is communicatively coupled to the non-transitory computer-readable medium device.

15. The method of claim 11, wherein the content comprises information concerning a further service or product that can be provided to the user of the product.

16. The method of claim 11, further comprising providing a matrix bar code printed on a surface of the non-transitory computer-readable medium device.

17. The method of claim 11, wherein the external computing device comprises a communication hub that communicates with a plurality of non-transitory computer-readable medium devices.

* * * * *

UNITED STATES PATENT AND TRADEMARK OFFICE
CERTIFICATE OF CORRECTION

PATENT NO. : 10,178,175 B2
APPLICATION NO. : 14/572411
DATED : January 8, 2019
INVENTOR(S) : Jurgen Schmerler Page 1 of 1

It is certified that error appears in the above-identified patent and that said Letters Patent is hereby corrected as shown below:

On the Title Page

Following item (65), add: --Related U.S. Application Data--.
Following the addition of Related U.S. Application Data , add: --(60) Provisional application no. 61/919,766 filed on December 22, 2013.--

Signed and Sealed this
Twenty-fifth Day of February, 2025

Coke Morgan Stewart
*Acting Director of the United States Patent and Trademark Office*